United States Patent [19]
Ohkijima et al.

[11] Patent Number: 5,736,262
[45] Date of Patent: Apr. 7, 1998

[54] MAGNETIC RECORDING MEDIUM

[75] Inventors: Shin Ohkijima; Masahiro Oka; Fumiaki Yokoyama, all of Yokohama, Japan

[73] Assignee: Mitsubishi Chemical Corporation, Tokyo, Japan

[21] Appl. No.: 567,417

[22] Filed: Dec. 5, 1995

[30] Foreign Application Priority Data

Dec. 5, 1994 [JP] Japan ................... 6-300731
Mar. 29, 1995 [JP] Japan ................... 7-071517

[51] Int. Cl.$^6$ ........................... G11B 5/66
[52] U.S. Cl. ............ 428/611; 428/212; 428/216; 428/336; 428/667; 428/668; 428/694 TM; 428/694 TS; 428/694 TP; 428/65.7; 428/694 TF; 428/694 TC; 428/900
[58] Field of Search ................. 428/212, 216, 428/611, 336, 667, 668, 694 TM, 694 TS, 694 TP, 65.7, 900, 694 TF, 694 TC

[56] References Cited

U.S. PATENT DOCUMENTS

| | | | |
|---|---|---|---|
| 5,543,221 | 8/1996 | Kitakami et al. | 428/332 |
| 5,569,533 | 10/1996 | Lal et al. | 428/332 |
| 5,587,235 | 12/1996 | Suzuki et al. | 428/332 |

*Primary Examiner*—Stevan A. Resan
*Attorney, Agent, or Firm*—Oblon, Spivak, McClelland, Maier & Neustadt, P.C.

[57] ABSTRACT

A magnetic recording medium comprising: a non-magnetic substrate;

a Co-based alloy magnetic layer (ML); and a non-magnetic Cr-based underlayer position between said magnetic layer and said substrate, compatibly provided with a high S/N and a high coercive force, and an intermediate layer (IL), formed of a Co-based alloy having the hcp structure, which is positioned between the magnetic layer and the non-magnetic underlayer, said intermediate layer having a ratio $R=(BsIL*IL)/(BsML*ML)$, which is the product $(BsIL*IL)$ of the saturation magnetic flux density (BsIL) of the Co-based alloy which constitutes said intermediate layer and the thickness (tIL) of the intermediate layer film to the product $(BsML*ML)$ of the saturation magnetic flux density (BsML) of the Co-based alloy which constitutes said magnetic layer and the magnetic layer film thickness (tML) at 0.2 or less.

14 Claims, 11 Drawing Sheets

5,736,262

MAGNETIC RECORDING MEDIUM

BACKGROUND OF THE INVENTION

1. Field of the Invention

The present invention relates to a magnetic recording medium and more specifically, to a longitudinal magnetic recording medium useful for magnetic data storage such as in hard discs, floppy disks and magnetic tapes.

2. Description of the Background

In recent years, the applicability of magnetic storage in the form of hard discs, floppy disks or magnetic tapes has been significantly expanded, and with its increasing importance, a marked increase in recording density of magnetic recording media has been reached which increases the magnetic storage capacity.

However, with respect to such magnetic recording media, there is till a demand to achieve further increases in recording density and for this reason, there is a need to achieve a higher coercive force (Hc) in the magnetic recording layer and a high signal-to-noise ratio (S/N).

One approach has been to add Pt to magnetic materials for the purpose of increasing coercive force. This technique is known to provide a high coercive force exceeding 2000 Oe. For example, Pt is added to Co-based materials and CoCrTa-based materials as disclosed in Published Unexamined Japanese Patent Application No. S59-88806 and U.S. Pat. No. 5,024,903, respectively.

However, while the addition of Pt is effective in raising the coercive force of the recording medium, on the other hand, it increases the medium noise. With a magnetic recording medium having a CoPt based magnetic layer formed thereon, the medium noise becomes higher even in comparison to a magnetic recording medium having a magnetic layer of CoCrTa having a relatively weak coercive force formed thereon. On the other hand, a method for reducing the medium noise is known which uses the alternate stacking of multiple magnetic layers and non-magnetic layers (Published Unexamined Japanese Patent Application No. H6-176341 and others). However, this method tends to decrease the coercive force of the recording medium because the magnetic layers are divided. Thus, no effective method has thus far been developed to achieve a magnetic recording medium which has both a higher coercive force and a lower medium noise. A need continues to exist for such a magnetic recording medium.

SUMMARY OF THE INVENTION

Accordingly, one object of the present invention is to provide a magnetic recording medium which enables the coercive force to be enhanced without a decrease in signal-to-noise ratio (s/N).

Briefly, this object and other objects of the present invention as hereinafter will become more readily apparent can be attained by a magnetic recording medium comprising a non-magnetic substrate; a Co-based alloy magnetic layer (ML); a non-magnetic Cr-based underlayer positioned between said magnetic layer and said substrate; and an intermediate layer (IL) formed of a Co-based alloy having the hexagonal closest packed (hcp) structure positioned between the magnetic layer and the non-magnetic underlayer, wherein the intermediate layer has a ratio $R=(BsIL*tIL)/(BsML*tML)$, which is the ratio of the product ($BsIL*tIL$) of the saturation magnetic flux density ($BsIL$) of the Co-based alloy, which constitutes the intermediate layer, and the intermediate layer film thickness ($tIL$) to the product ($BsML*tML$) of the saturation magnetic flux density ($BsML$) of the Co-based alloy, which constitutes the magnetic layer, and the magnetic layer film thickness ($tML$), is 0.2 or less.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
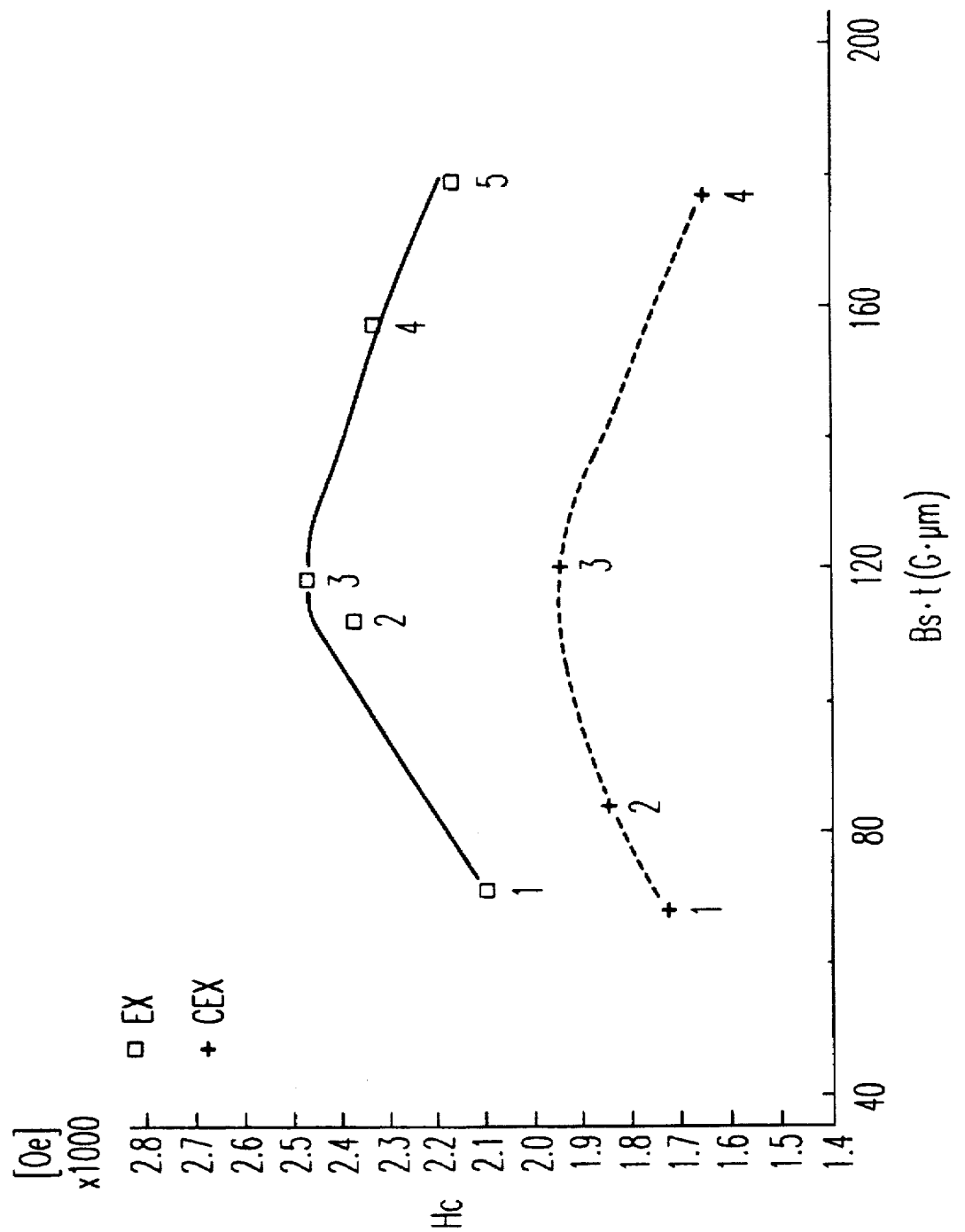
FIG. 1 is a graph which shows the relationship of the product Bs*t of the saturation magnetic flux density and the film thickness of the coercive force Hc, obtained in Embodiments 1–5 and Comparative Examples 1–4.

In the present invention, the non-magnetic substrate is usually an aluminum alloy substrate which is provided with a Ni—P layer thereon by electroless plating. Alternatively, a glass substrate can be employed, but a ceramic substrate, a carbon substrate, a Si substrate, various resin substrates and all other non-magnetic substrates can also possibly be used.

In addition to Cr, the non-magnetic Cr-based underlayer formed on the non-magnetic substrate may contain one or more additional elements including Si, Ti, V, Mo, W and the like in a quantity of 30 at. % or less. The film thickness of this non-magnetic underlayer is usually 100–2000 Å, preferably 200–2000 Å. In the event the thickness of the underlayer is less than 100 Å, the recording medium exhibits a great decrease in coercive force.

The Co-based alloy intermediate layer formed on the underlayer has the hcp crystal structure, and has the feature of a non-magnetic or feeble magnetic intermediate layer in which the ratio (R) of the product (BsIL*tIL) of the saturation magnetic flux density (BsIL) of the Co-based alloy, which constitutes the intermediate layer, and the intermediate layer film thickness (tIL) to the product (BsML*tML) of the saturation magnetic flux density (BsML) of the Co-based alloy, which constitutes the magnetic layer, and the magnetic layer film thickness (tML) is 0.2 or less. That is, the following equation should be satisfied:

$$R=(BsML*tIL)/(BsIL*tIL)<=0.2 \quad (I)$$

The product Bs*t of the saturation magnetic flux density (Bs) and the film thickness (t) denotes the saturation magnetizing quantity of a magnetic layer per unit area. The value of Bs*t of the intermediate layer according to the present invention (BsIL*tIL) should be 20% or less, preferably 10% or less, more preferably 0 of the value of Bs*t of the Co-based alloy magnetic layer (BsML*tML). If the ratio (R) exceeds 0.2, deterioration of magnetic characteristics, such as a decrease in coercive force occurs.

The provision of the intermediate layer in the structure of the present recording medium is directed to improving the characteristics of the initial growth layer of the Co-based alloy magnetic layer and accordingly the intermediate layer itself is preferably not magnetic. By setting the saturation magnetic flux density of the intermediate layer to such a small value as to satisfy the Eq. (I), above all 0 Gauss (R=0), the magnetic influence of the intermediate layer on the magnetic recording medium can be completely eliminated.

Suitable materials for the Co-based intermediate layer in the present invention includes alloys of at least one element selected from the group of Cr, Ta, Ti, W, V, Mo and Si with Co. The content of these elements M in the intermediate layer material may be appropriately chosen and is not restricted at all, but normally is on the order of 20–50 at. %. In addition, a part of the Co content can be another magnetic element such as Ni. The intermediate layer is preferably non-magnetic. For example, for a Co—Cr intermediate layer, preferably a zero saturation magnetic flux density is implemented. It has the hcp crystal structure and has a Cr content of 34–45 at. %.

Unless the performance characteristics of the intermediate layer are adversely affected, a several % or less amount of other elements such as Ge, Cu, Zn, nitrogen, oxygen and hydrogen, may also be present in the alloy of the intermediate layer.

Furthermore, in order to adjust the lattice constant with that of Co-based alloy magnetic layer, other elements can be included in the intermediate layer.

Incidentally, the film thickness of such an intermediate layer is 10–1000 Å, preferably 50–500 Å.

Suitable Co-based alloys of the Co-based alloy magnetic layer which is formed on the intermediate layer include CoCr, CoNiCr, CoPt and the like alloys. Further, these alloys may contain such elements as Ni, Cr, Pt, Ta and B. Preferred Co-based alloys of the Co-based alloy magnetic layer are CoCrTa alloy, CoNiCrBTa alloy and CoPtCrTa alloy. The magnetic layer is not especially limited in thickness, but normally is of a thickness of 100–800 Å.

The magnetic recording medium of the present invention is normally produced by successively forming the underlayer, the intermediate layer and the magnetic layer on the non-magnetic substrate. Preferably, the successive stacking of the layers and layer deposition are conducted without exposure of the layers to the air by use of a vacuum throughout the whole process.

Incidentally, in order to conduct film deposition, either a DC or RF magnetron sputtering process may be employed. The sputter conditions in film deposition are not especially restricted, and the bias voltage, substrate temperature, sputter gas pressure, background pressure and the like are appropriately determined by the selection of the sputter materials. Normally, at a bias voltage (absolute value) of 50–500V for film deposition, the substrate temperature should range from room temperature to 300° C., the sputter gas pressure should range from $1\times10^{-3}$ to $20\times10^{-3}$ Torr and the background pressure should be $1\times10^{-6}$ Torr.

The magnetic recording medium of the present invention may have a stacked structure having similar intermediate and magnetic layers further provided on the Co-based alloy magnetic layer, as long as the requirement for the above combination of the intermediate and Co-based alloy magnetic layer is satisfied.

That is, a feature of the magnetic recording medium of the present invention is the positioning of the Co-based alloy non-magnetic (or feebly magnetic) intermediate layer between the top magnetic layer or the recording layer and the Cr-based underlayer. For example, an embodiment of the magnetic recording medium is one in which a metal coat layer is provided between the non-magnetic substrate and the underlayer, and where the magnetic layer comprises a stacked structure of two or more Co-based alloy layers, wherein a non-magnetic intermediate layer is provided and stacked on the magnetic layer, or wherein a carbonaceous protection layer and/or lubricating layer, made of the usual lubricant, or like layer is formed on the magnetic layer.

An important feature of the invention is that by using a non-magnetic or feebly magnetic intermediate Co-based alloy layer having the hcp structure under the magnetic layer, the magnetic influence attributable to the intermediate layer is completely eliminated or markedly minimized. Moreover, the characteristics of the initial growth of the Co-based alloy magnetic layer, as the recording layer, can be effectively improved, thereby greatly improving the coercive force and recording performance of the recording medium.

Having generally described this invention, a further understanding can be obtained by reference to certain specific examples which are provided herein for purposes of illustration only and are not intended to be limiting unless otherwise specified.

In the present invention, the values of remanence magnetic flux density (Br), saturation magnetic flux density (Bs) and Coercive force (Hc) were calculated on the basis of an MH loop (hysteresis loop) measured with a VSM (Vibration Sample "Magnetometer" BSM-3S made by Toei Kogyo K.K.).

The conditions for measurement are as follows:
Maximum applied magnetic field 5000 (Oe)
Sample size (length×width)
8 mm×8 mm Analysis of the composition of the magnetic layers was carried out with fluorescent x-ray analysis.

As shown in Tables 1-1 and 1-2 infra, the embodiments and Comparative Examples were tested under various conditions.

Embodiments 1–19 and Comparative Examples 1–4

[Embodiments 1–5]

On the surface of an aluminum alloy disk substrate having a 25 mm inside diameter and a 95 mm outside diameter, a non-magnetic Ni—P layer was formed at a thickness of 25 μm by electroless plating. The surface was finished to an Ra (center line average roughness) of 20–30 Å by mirror surface grinding.

After mounting this substrate in a RF (13.56 MHz) magnetron sputtering system and evacuating the chamber to $3 \times 10^{-6}$ Torr, the substrate temperature was elevated up to 250° C. and a Cr underlayer having a thickness of approximately 600 Å was formed, while applying a bias voltage of DC-100V to the substrate under an argon partial pressure of $5 \times 10^{-3}$ Torr.

Then, by forming a magnetic film comprising 80 at. % of Co, 14 at. % of Cr and 6 at. % of Ta, having a thickness of 150–400 Å after forming a CoCr film comprising 63 at. % of Co and 37 at. % of Cr as the intermediate layer at a thickness of 100 Å, samples exhibiting a Br*t (the product of remanence magnetic flux density and film thickness), ranging from 60 to 180 gauss*μm were prepared (Embodiments 1–5).

Incidentally, a CoCr film comprising 63 at. % of Co and 37 at. % of Cr as the intermediate layer, is a non-magnetic substance which exhibits a Bs value of 0 Gauss and has the hcp structure.

The relationship between Bs*t and Hc of the obtained samples is shown in FIG. 1.

[Embodiments 6–9]

Except for using a CoCr film comprising 62 at. % of Co, 37 at. % of Cr and 1 at. % of Ta as the intermediate layer, samples were prepared in the same manner as described for Embodiments 1–5.

Figure 2:
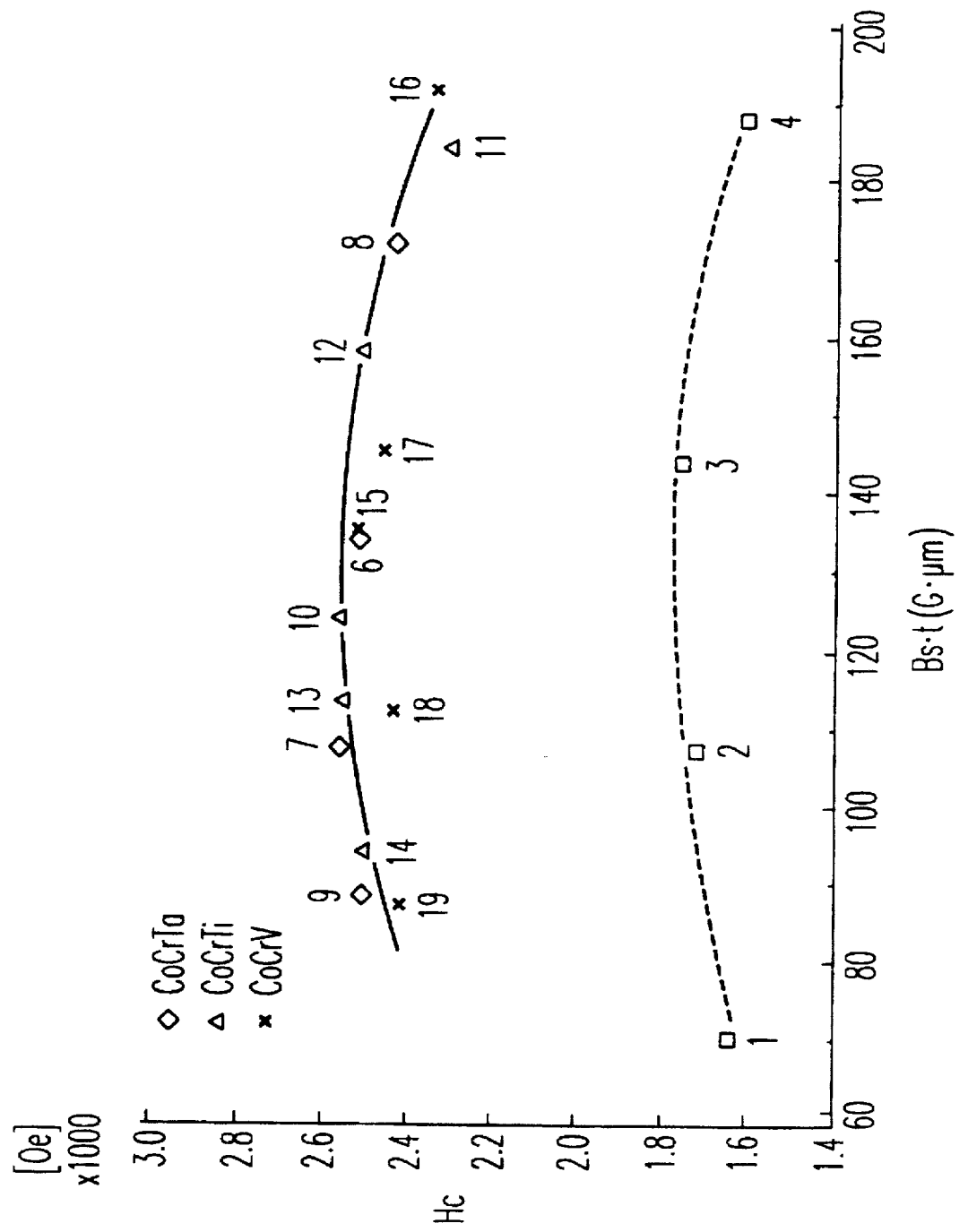
FIG. 2 is a graph which shows the relationship of the product Bs*t of the saturation magnetic flux density and the film thickness to the coercive force Hc, obtained in Embodiments 6–19 and Comparative Examples 5–7.

The relationship between Bs*t and Hc of the obtained samples is shown in FIG. 2.

[Embodiments 10–14]

Except for using a CoCr film comprising 60.5 at. % of Co, 36 at. % of Cr and 3.5 at. % of Ti as the intermediate layer, samples were prepared in the same manner as described for Embodiments 1–5.

The relationship between Bs*t and Hc of the obtained samples is shown in FIG. 2.

[Embodiments 15–19]

Except for using a CoCr film comprising 59.5 at. % of Co, 36 at. % of Cr and 4.5 at. % of V as the intermediate layer, samples were prepared in the same manner as described for Embodiments 1–5.

The relationship between Bs*t and Hc of the obtained samples is shown in FIG. 2.

[Comparative Examples 1–4]

Except for film deposition without having a CoCr intermediate layer provided, samples were prepared under conditions similar to those of Embodiments 1–5. The relationship between Bs*t and Hc of the obtained samples is shown in FIG. 1.

As can be clearly observed from the data in Table 1-1 and FIGS. 1 and 2, Hc rises by 400–800 Oe because of the formation of the Co-based alloy intermediate layer.

Embodiments 20–23 and Comparative Examples 5–8.

The magnetic recording media of these embodiments were prepared in the same manner as described in Embodiments 1–5 and Comparative Examples 1–4 above. Further, a 150 Å thick C (carbon) protection film was formed on each magnetic layer by the sputtering process and a fluoride lubricant layer was applied thereon in each case at a thickness of 30 Å. For each of the magnetic recording media obtained, recording performance was measured.

Incidentally, measurements of recording performance were carried out using an MR (magnetoresistive) head for hard disk. The specifications and measurement conditions of the head which was used are shown as follows:

| | |
|---|---|
| Head flying height | 750 Å |
| Recording gap length | 0.78 μm |
| Playback shield width | 0.22 μm |
| Playback track width | 4.21 μm |
| Disk rotation number | 3,600 rpm |
| Measured diameter | 23 mm |
| Record frequency | 20.1 MHz |

Figure 3:
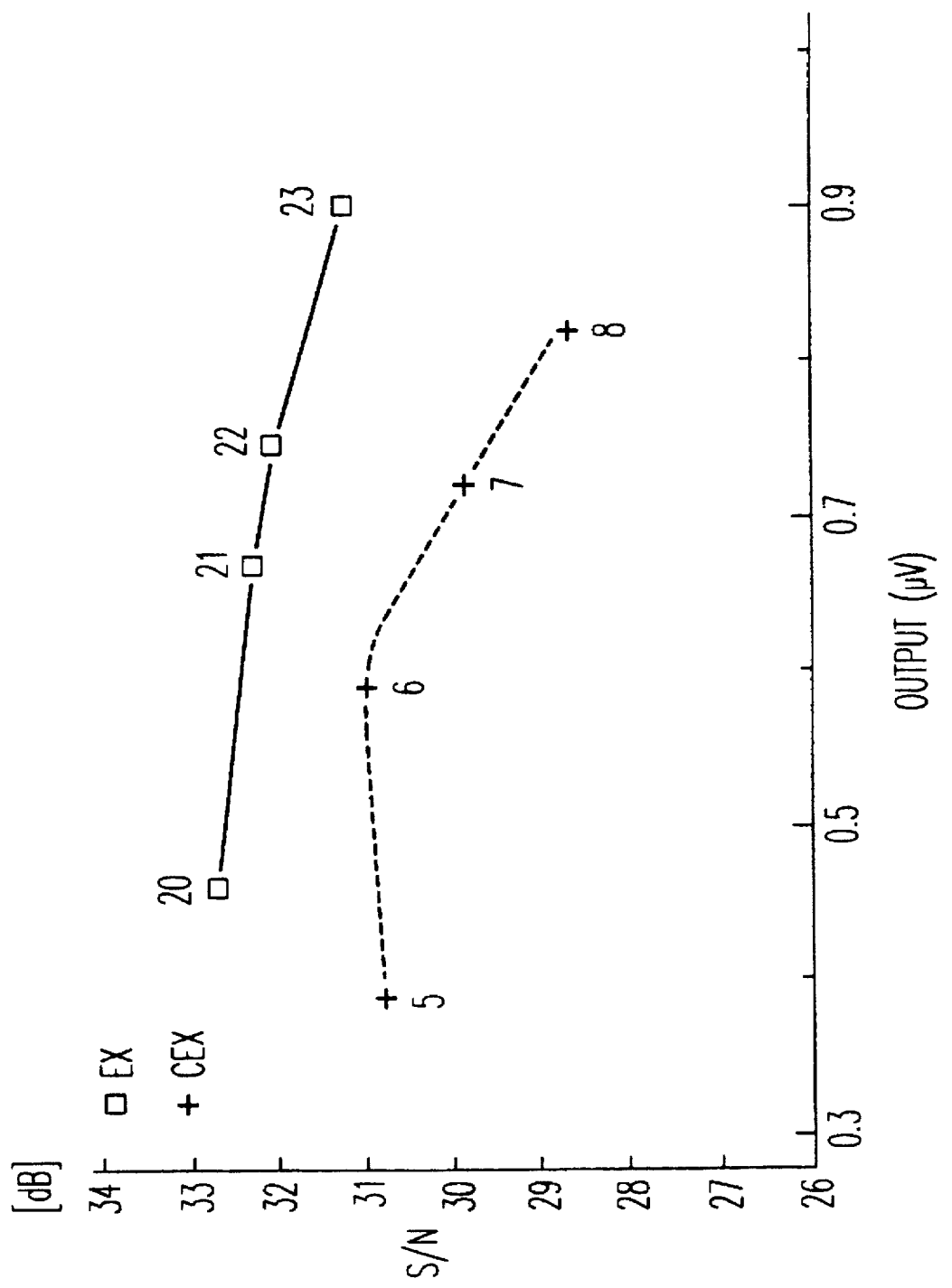
FIG. 3 is a graph which shows the relationship of the readback output and the S/N, obtained in Embodiments 11–14 and Comparative Examples 8–11.
Figure 4:
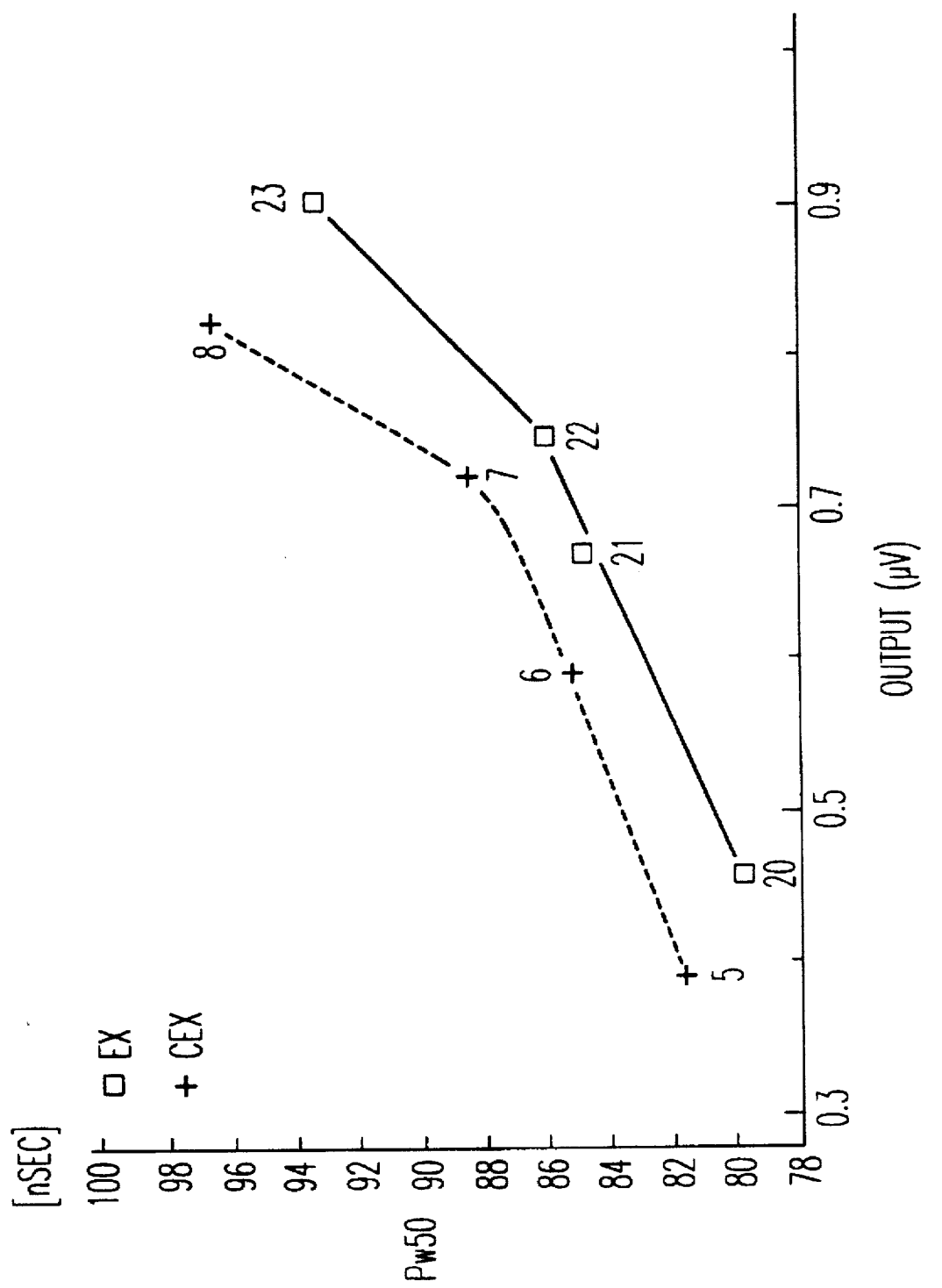
FIG. 4 is a graph which shows the relationship of the readback output and the half-width PW50 of an isolated readback waveform, obtained in Embodiments 11–14 and Comparative Examples 8–11.

Table 2 infra shows the measured results of recording performance. FIGS. 3 and 4 show the relationship of the readback output to the S/N of magnetic recording media and that of the readback output and the half-width (PW50) of isolated readback waveforms, respectively.

From Table 2 and FIGS. 3 and 4, it is found that a magnetic recording medium provided with a CoCr intermediate layer is superior with respect to S/N and resolving power in comparison to other intermediate layer alloys.

Embodiments 24–28 and Comparative Examples 9–10

[Embodiments 24–28]

Except for varying the Cr content of the CoCr intermediate layer from approximately 29 at. % to 44 at. %, samples were prepared in the same manner as described in Embodiments 1–5.

[Comparative Example 9]

Except for setting the Cr content of the CoCr intermediate layer to 24 at. %, samples were prepared in the same manner as described in Embodiments 1–5.

[Comparative Example 10]

Except for setting the Cr content of the CoCr intermediate layer to 24 at. %, samples were prepared in the same manner as described in Embodiments 1–5.

Incidentally, with all these examples, except for Comparative Example 10, any Co-based alloy intermediate layer used has the hcp structure and the Bs (ML) of Co(80)Cr (14)Ta(6) was 5,500 (Gauss).

Figure 5:
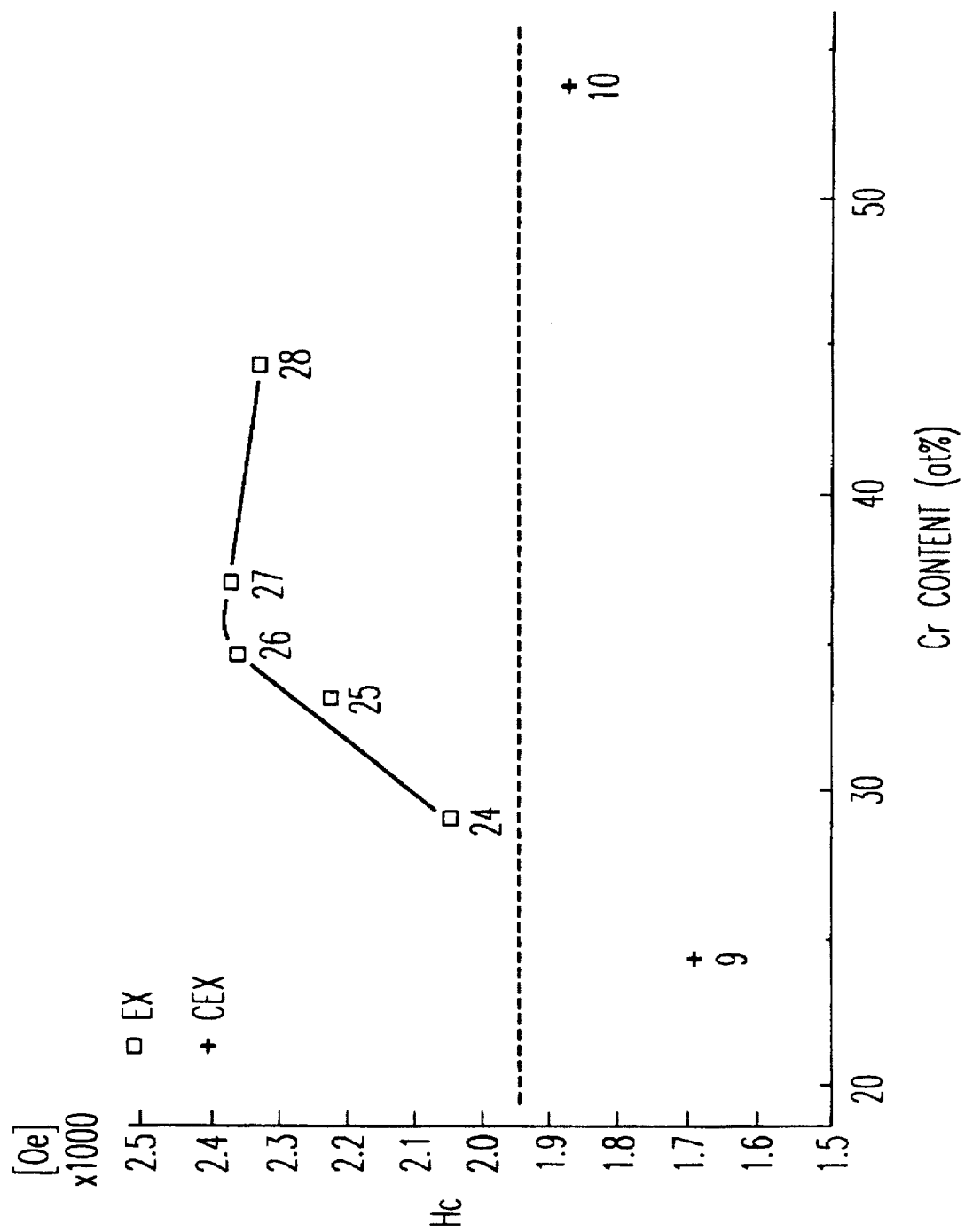
FIG. 5 is a graph which shows the relationship of the Cr content of the CoCr intermediate layer to the coercive force Hc, obtained in Embodiments 24–28 and Comparative Examples 9–10.
Figure 6:
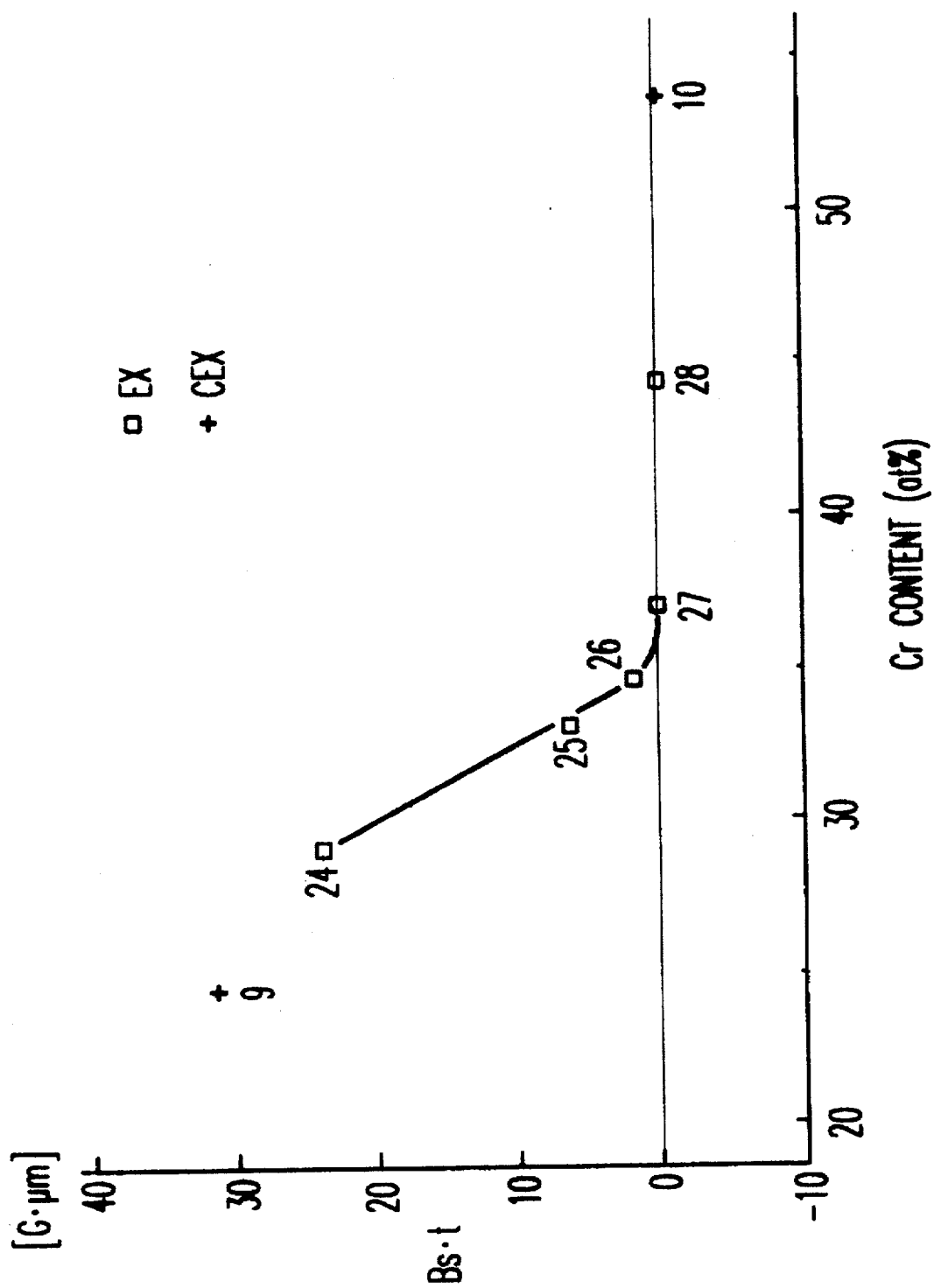
FIG. 6 is a graph which shows the relationship of the Cr content of the CoCr intermediate layer to the product Bs*t of the saturation magnetic flux density and the film thickness, obtained in Embodiments 24–28 and Comparative Examples 9–10.

Regarding the samples obtained in Embodiments 24–28 and comparative Examples 9 and 10, the relationship of the Cr content of the CoCr intermediate layer to the coercive force Hc of the layer and the relationship of the Cr content of the CoCr intermediate layer to the product Bs*t of its saturation magnetic flux density and its film thickness, are shown in FIGS. 5 and 6, respectively.

As clearly can be observed from Table 1 and FIGS. 5 and 6, a marked increase in coercive force Hc is obtained for the hcp structure and for the range of Bs*t (ML)/Bs*t (IL) less than 0.200, in particular less than 0.015.

In addition, with CoCr alloys, this condition corresponds to the range of Cr content from 27 to 52 at. % and, therefore, it is to be understood that a marked effect is obtained especially in the range of a Cr content from 34 to 47 at. %.

Note that only in Comparative Example 6, the CoCr intermediate layer has no hcp structure. Such a structure is evidently important in the CoCr intermediate layer alloy of the present invention.

Furthermore, as is evident from Table 1-1 and considering that the CoCr intermediate layer is non-magnetic (Bs=0), especially in Embodiments 27 and 28 which exhibit a high coercive force, it is desired that the intermediate layer be non-magnetic.

Embodiments 29–34 and Comparative Examples 11–5

Changing the CoCrPt magnetic layer for a CoCrPt magnetic layer comprising 70 at. % of Co, 21 at. % of Cr and 9 at. % of Pt and using the preparative conditions of Embodiments 1-5, samples of Embodiments 29-34 were prepared under similar conditions.

Except for the film deposition step without having the CoCr intermediate layer provided, samples were prepared under exactly the same conditions as described above (Comparative Examples 11-15).

Figure 7:
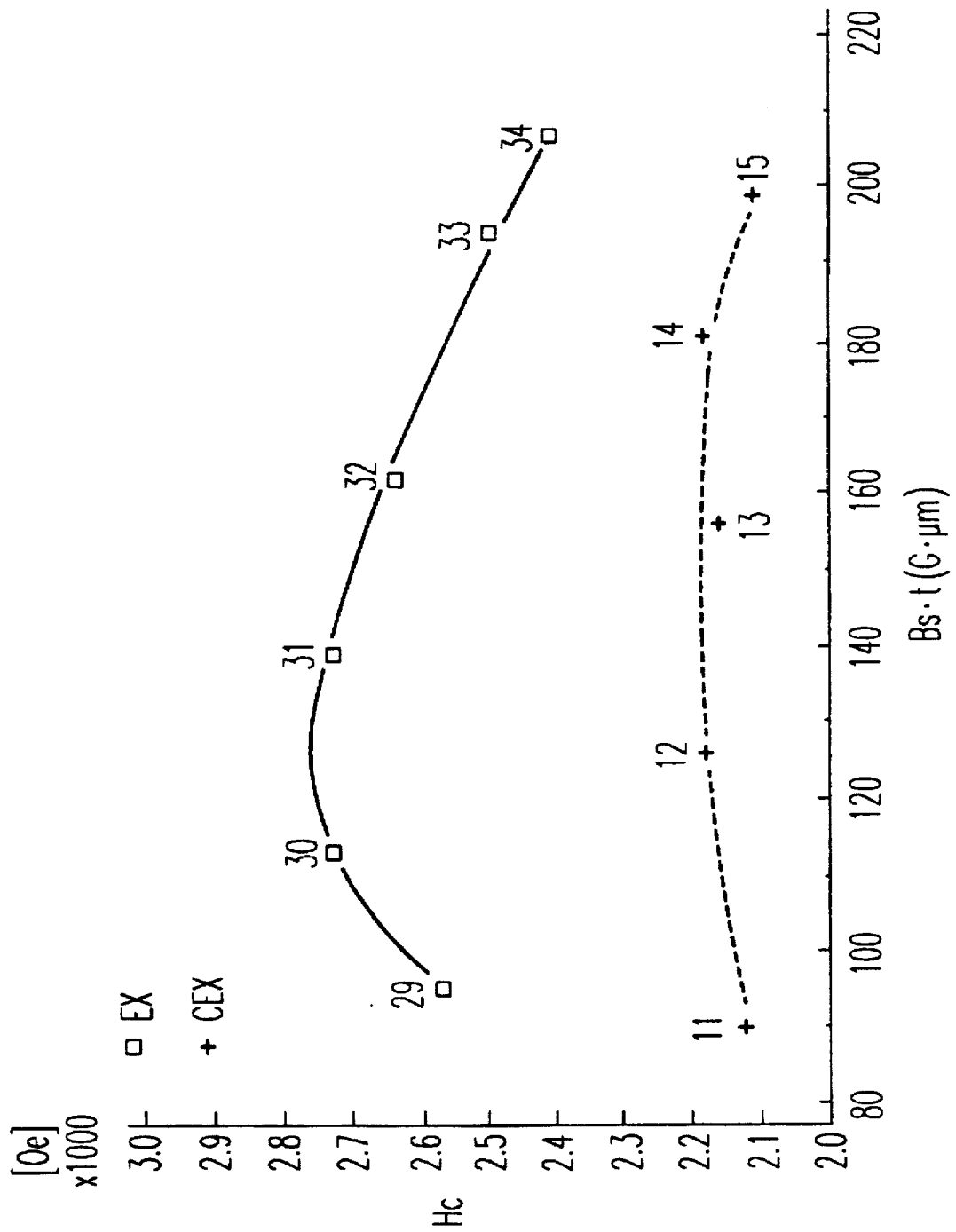
FIG. 7 is a graph which shows the relationship of the product Bs*t of the saturation magnetic flux density and the film thickness to the coercive force Hc, obtained in Embodiments 29–34 and Comparative Examples 11–15.

The composition, coercive force and preparative conditions of each sample and the relationship of the coercive force Hc to Bs*t are shown in Table 1 and FIG. 7, respectively.

From Table 1-1 and FIG. 7, it is evident that the effect attributable to the Co-based alloy intermediate layer is obtained even if the magnetic layer does not contain Ta.
Embodiments 35-37 and Comparative Examples 16-18.

Upon exchanging the RF sputtering process with the DC sputtering process and the CoCrTa magnetic layer with a CoNiCrBTa magnetic layer comprising 56.5 at. % of Co, 30 at. % o Ni, 7.5 at. % of Cr, 3 at. % of B and 3 at. % of Ta and further modifying the bias voltage from −100V to −500V, and the thickness of the CoCr intermediate layer from 100 Å to 50 Å in the preparative conditions of Embodiments 1-5, samples of Embodiments 35-37 were prepared in a similar fashion.

Except for film deposition without having the CoCr intermediate layer provided, samples were prepared under exactly the same conditions as described above (Comparative Examples 16-18).

Figure 8:
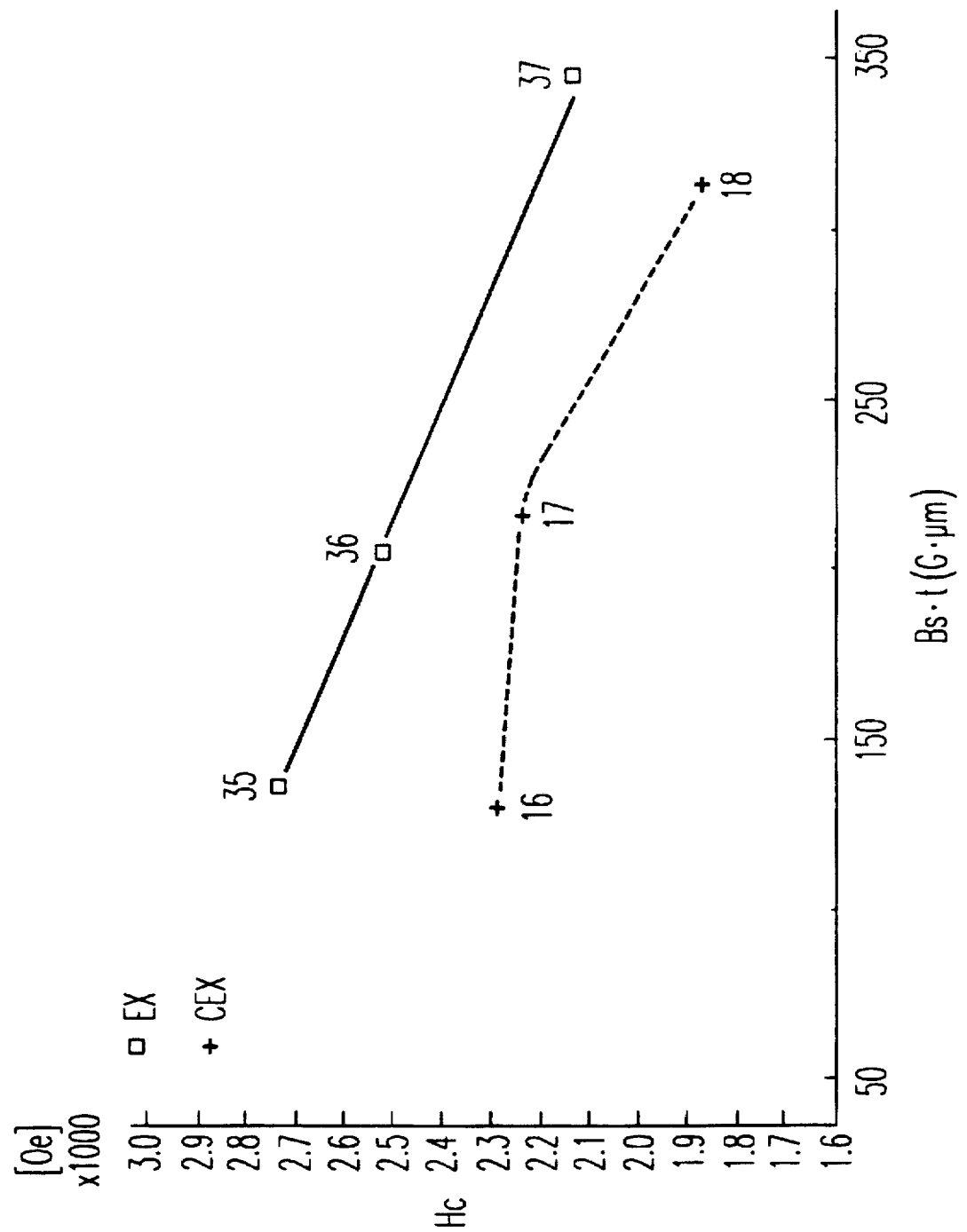
FIG. 8 is a graph which shows the relationship of the product Bs*t of the saturation magnetic flux density and the film thickness to the coercive force Hc, obtained in Embodiments 35–37 and Comparative Examples 16–18.

The composition, coercive force and preparative conditions of each sample and the relationship of the coercive force HC to Bs*t are shown in Table 1-2 and FIG. 8, respectively.

From Table 1-2 and FIG. 8, it is evident that the effect attributable to the Co-based alloy intermediate layer is obtained even if the sputtering process, bias voltage and magnetic layer are modified in type.
Embodiments 38-41 and Comparative Examples 19-22.

Upon exchanging the RF sputtering process with the DC sputtering process and the CoCrTa magnetic layer with a CoCrPtTa magnetic layer comprising 80 at. % of Co, 12 at. % of Cr, 6 at. % of Pt and 2 at. % of Ta and further modifying the bias voltage from −100V to −300V, the thickness of the Cr underlayer from 600 Å to 850 Å and the thickness of the CoCr intermediate layer from 100 Å to 170 Å in the preparative conditions of Embodiments 1-5, samples of Embodiments 38-41 were prepared in a similar fashion.

Except for film deposition without having the CoCr intermediate layer provided, samples were prepared under exactly the same conditions as described above (Comparative Examples 19-22).

Figure 9:
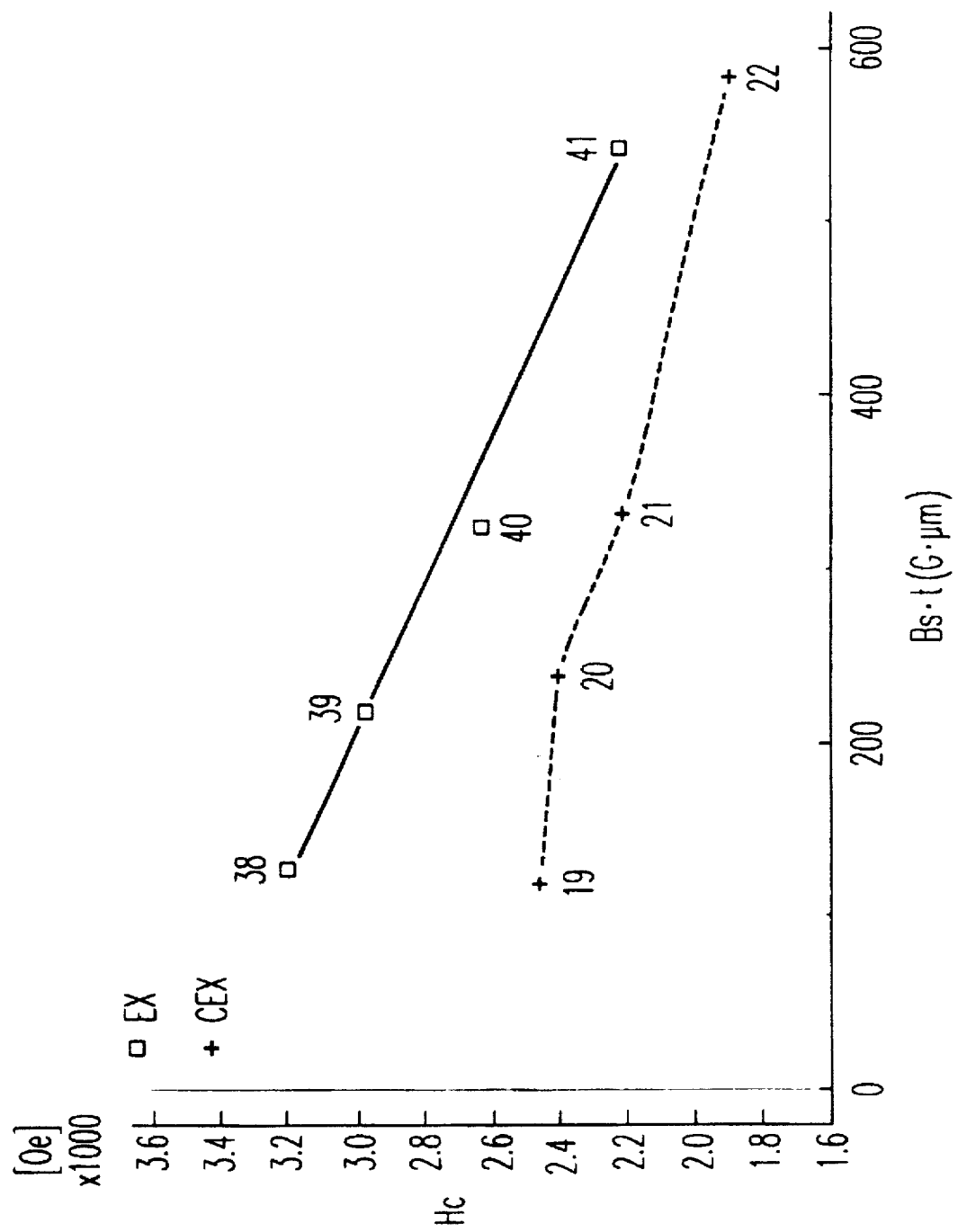
FIG. 9 is a graph which shows the relationship of the product Bs*t of the saturation magnetic flux density and the film thickness to the coercive force Hc, obtained in Embodiments 38–41 and Comparative Examples 19–22.

The composition, characteristics and preparative conditions of each sample and the relationship of the coercive force Hc to Bs*t of each magnetic recording medium obtained are shown in Table 1-2 and FIG. 9, respectively.

From Table 1-2 and FIG. 9, it is evident that the effect attributable to the present invention is obtained also in a Co-based alloy magnetic layer containing Pt.
Embodiments 42-45 and Comparative Example 23.

Upon exchanging the magnetic layer with a 250 Å thick magnetic layer comprising 78 at. % of Co, 17 at. % of Cr and 5 at. % of Ta in the preparative conditions of Embodiments 1-5, the samples of (Embodiments 42-45) of the intermediate layer having a thickness varying from 50 to 500 Å were prepared in a similar fashion.

Except for film deposition without having the CoCr intermediate layer provided, samples were prepared under exactly the same conditions as described above (Comparative Example 23).

Figure 10:
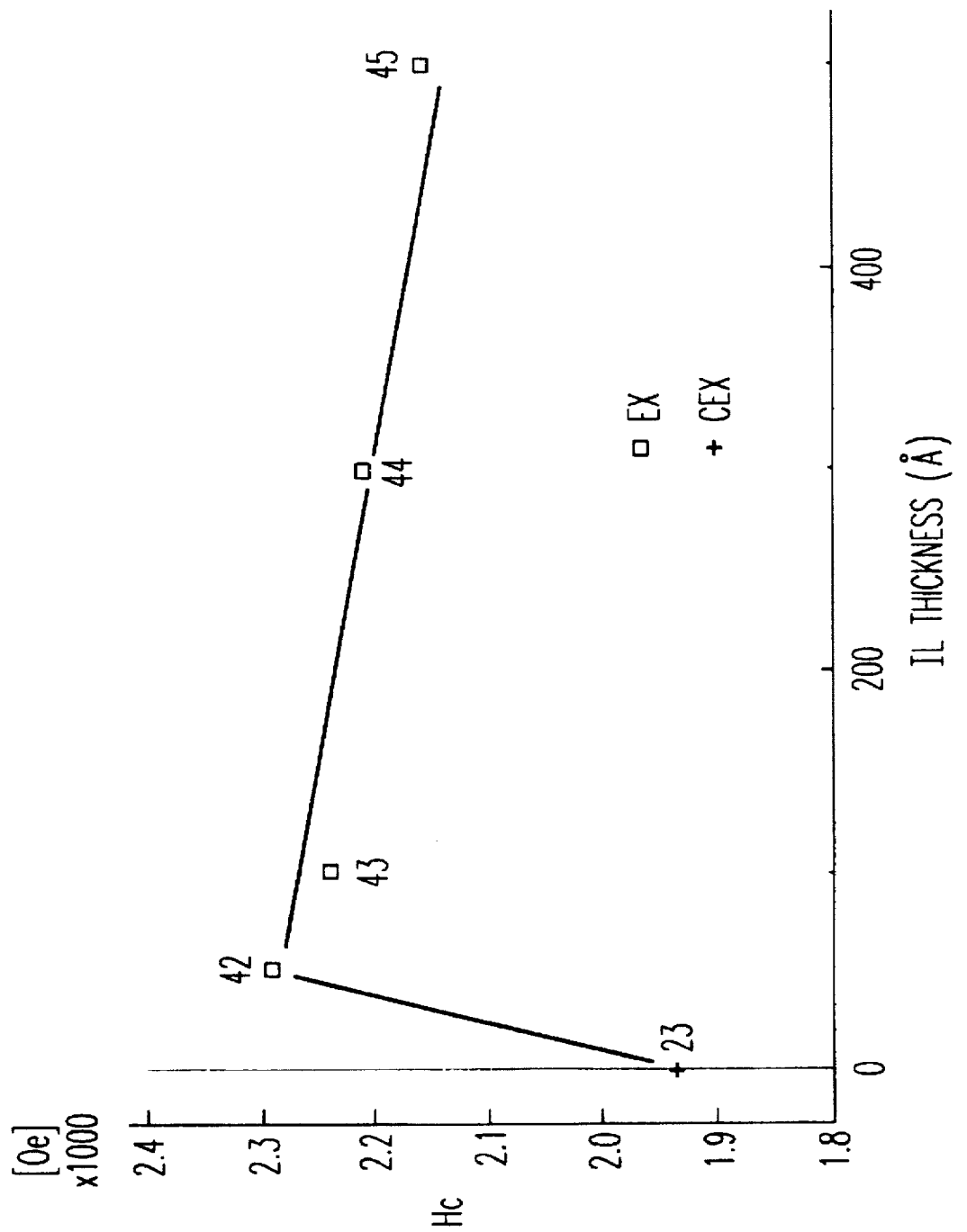
FIG. 10 is a graph which shows the relationship of the thickness of the CoCr intermediate layer to the coercive force Hc, obtained in Embodiments 42–45 and Comparative Example 23.

The composition, characteristics and preparative conditions of each sample and the relationship of the coercive force Hc to Bs*t of each magnetic recording medium obtained are shown in Table 1-2 and FIG. 10, respectively.

From Table 1-2 and FIG. 10, it can be understood that the coercive force tends to decrease with increasing thickness of the intermediate layer and it is considered appropriate that the thickness of the intermediate layer be 500 Å or less.
Embodiments 46-49 and Comparative Examples 24-26.

Setting the thickness of the CoCr intermediate layer to 100 Å in the preparative conditions of Embodiments 42-45, samples of (Embodiments 46-49), with the thickness of the Cr underlayer varying from 100 to 600 Å, were prepared in a similar fashion.

Except for film deposition without having the CoCr intermediate layer provided, samples were prepared under exactly the same conditions as described above (Comparative Examples 24-26).

Figure 11:
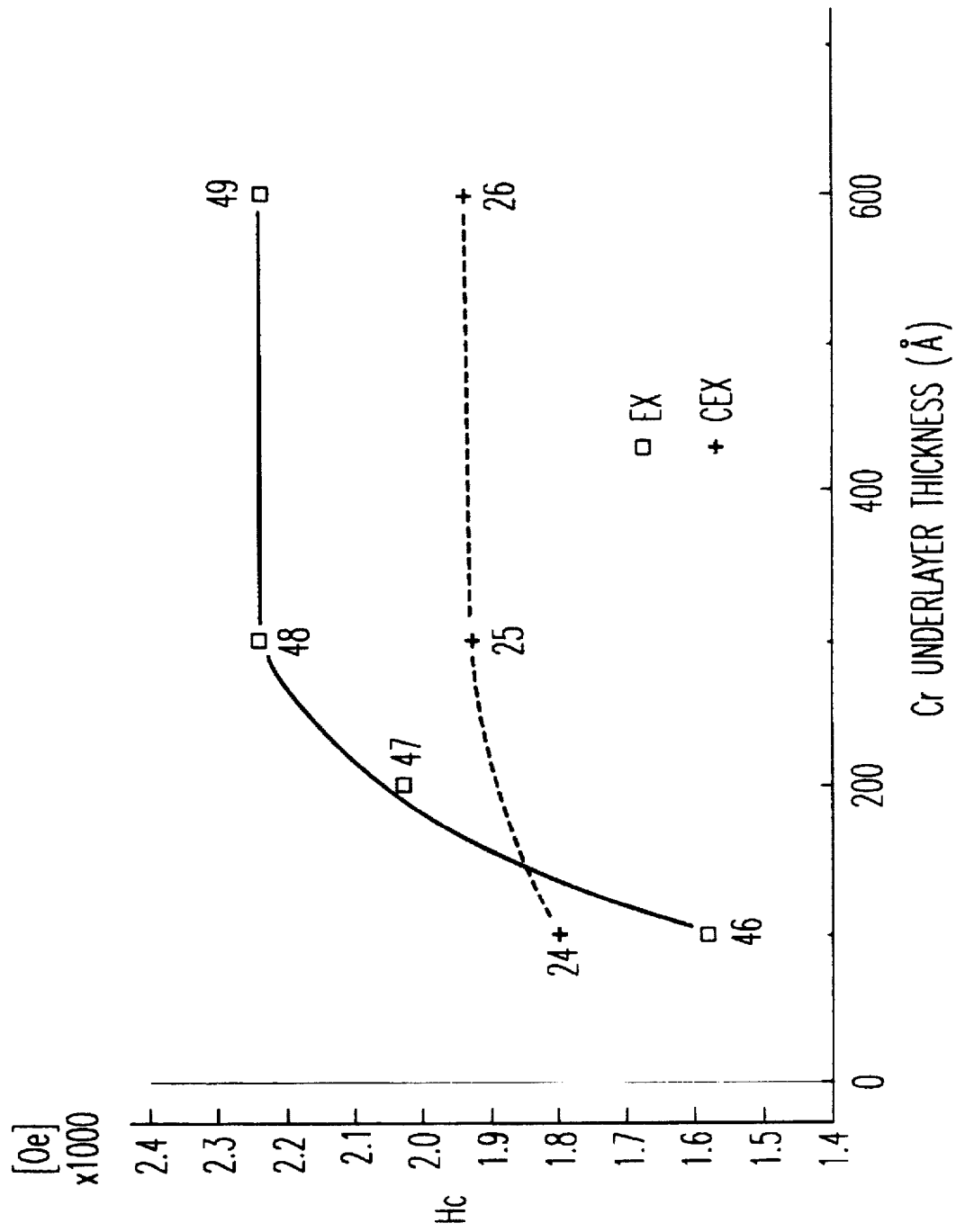
FIG. 11 is a graph which shows the relationship of the thickness of the Cr underlayer to the coercive force Hc, obtained in Embodiments 46–49 and Comparative Examples 24–26.

The composition, characteristics and preparative conditions of each sample and the relationship of the coercive force Hc to Bs*t of each magnetic recording medium obtained are shown in Table 1-2 and FIG. 11, respectively, From Table 1-2 and FIG. 11, it can be understood that the coercive force tends to decrease with increasing thickness of the intermediate layer and it is believed appropriate that the thickness of the intermediate layer is 1000 Å or less.

As described above, according to the present invention, a magnetic recording medium exhibiting a markedly high coercive force and excellent recording performance in comparison to conventional magnetic recording media., and highly suitable for a high density recording is provided.

TABLE 1-1

| | Magnetic Layer (ML) | Thickness (Å) | Br·t (ML) (G·μm) | Bs·t (ML) (G·μm) | Intermediate Layer (IL) | Thickness (Å) | Bs·t (IL) (G·μm) | Bs·t (ML) /Bs·t (IL) | H c (Oe) | Sputter Method | Bias V | Thickness of Cr Underlayer (Å) |
|---|---|---|---|---|---|---|---|---|---|---|---|---|
| EX 1 | Co(80)Cr(14)Ta(6) | 150 | 63 | 71 | Co(63)Cr(37) | 100 | 0 | 0 | 2100 | HF | −100 | 600 |
| EX 2 | Co(80)Cr(14)Ta(6) | 230 | 101 | 112 | Co(63)Cr(37) | 100 | 0 | 0 | 2375 | HF | −100 | 600 |
| EX 3 | Co(80)Cr(14)Ta(6) | 250 | 107 | 118 | Co(63)Cr(37) | 100 | 0 | 0 | 2475 | HF | −100 | 600 |
| EX 4 | Co(80)Cr(14)Ta(6) | 300 | 141 | 157 | Co(63)Cr(37) | 100 | 0 | 0 | 2338 | HF | −100 | 600 |
| EX 5 | C6(80)Cr(14)Ta(6) | 400 | 172 | 179 | Co(63)Cr(37) | 100 | 0 | 0 | 2175 | HF | −100 | 600 |
| EX 6 | Co(80)Cr(14)Ta(6) | 300 | 115 | 134 | Co(62)Cr(37)Ta(1) | 100 | 0 | 0 | 2530 | HF | −100 | 600 |
| EX 7 | Co(80)Cr(14)Ta(6) | 250 | 89 | 107 | Co(62)Cr(37)Ta(1) | 100 | 0 | 0 | 2560 | HF | −100 | 600 |
| EX 8 | Co(80)Cr(14)Ta(6) | 400 | 150 | 172 | Co(62)Cr(37)Ta(1) | 100 | 0 | 0 | 2440 | HF | −100 | 600 |
| EX 9 | Co(80)Cr(14)Ta(6) | 200 | 71 | 88 | Co(62)Cr(37)Ta(1) | 100 | 0 | 0 | 2510 | HF | −100 | 600 |
| EX 10 | Co(80)Cr(14)Ta(6) | 300 | 102 | 124 | Co(60.5)Cr(36)Ti(3.5) | 100 | 0 | 0 | 2570 | HF | −100 | 600 |

TABLE 1-1-continued

| | Magnetic Layer (ML) | Thickness (Å) | Br·t (ML) (G·μm) | Bs·t (ML) (G·μm) | Intermediate Layer (IL) | Thickness (Å) | Bs·t (IL) (G·μm) | Bs·t (ML) /Bs·t (IL) | H c (Oe) | Sputter Method | Bias V | Thickness of Cr Underlayer (Å) |
|---|---|---|---|---|---|---|---|---|---|---|---|---|
| EX 11 | Co(80)Cr(14)Ta(6) | 400 | 147 | 184 | Co(60.5)Cr(36)Ti(3.5) | 100 | 0 | 0 | 2320 | HF | −100 | 600 |
| EX 12 | Co(80)Cr(14)Ta(6) | 350 | 126 | 158 | Co(60.5)Cr(36)Ti(3.5) | 100 | 0 | 0 | 2520 | HF | −100 | 600 |
| EX 13 | Co(80)Cr(14)Ta(6) | 250 | 88 | 113 | Co(60.5)Cr(36)Ti(3.5) | 100 | 0 | 0 | 2560 | HF | −100 | 600 |
| EX 14 | Co(80)Cr(14)Ta(6) | 200 | 74 | 94 | Co(60.5)Cr(36)Ti(3.5) | 100 | 0 | 0 | 2510 | HF | −100 | 600 |
| EX 15 | Co(80)Cr(14)Ta(6) | 300 | 108 | 135 | Co(59.5)Cr(36)V(4.5) | 100 | 0 | 0 | 2530 | HF | −100 | 600 |
| EX 16 | Co(80)Cr(14)Ta(6) | 400 | 161 | 192 | Co(59.5)Cr(36)V(4.5) | 100 | 0 | 0 | 2350 | HF | −100 | 600 |
| EX 17 | Co(80)Cr(14)Ta(6) | 350 | 120 | 145 | Co(59.5)Cr(36)V(4.5) | 100 | 0 | 0 | 2470 | HF | −100 | 600 |
| EX 18 | Co(80)Cr(14)Ta(6) | 250 | 94 | 112 | Co(59.5)Cr(36)V(4.5) | 100 | 0 | 0 | 2440 | HF | −100 | 600 |
| EX 19 | Co(80)Cr(14)Ta(6) | 200 | 73 | 87 | Co(59.5)Cr(36)V(4.5) | 100 | 0 | 0 | 2420 | HF | −100 | 600 |
| CEX 1 | Co(80)Cr(14)Ta(6) | 150 | 62 | 68 | | 0 | | | 1725 | HF | −100 | 600 |
| CEX 2 | Co(80)Cr(14)Ta(6) | 200 | 79 | 84 | | 0 | | | 1850 | HF | −100 | 600 |
| CEX 3 | Co(80)Cr(14)Ta(6) | 260 | 108 | 120 | | 0 | | | 1950 | HF | −100 | 600 |
| CEX 4 | Co(80)Cr(14)Ta(6) | 400 | 152 | 177 | | 0 | | | 1663 | HF | −100 | 600 |
| EX 24 | Co(80)Cr(14)Ta(6) | 260 | 129 | 147 | Co(71)Cr(29) | 100 | 24 | 0.168 | 2050 | HF | −100 | 600 |
| EX 25 | Co(80)Cr(14)Ta(6) | 260 | 112 | 124 | Co(67)Cr(33) | 100 | 6 | 0.042 | 2230 | HF | −100 | 600 |
| EX 26 | Co(80)Cr(14)Ta(6) | 260 | 125 | 143 | Co(65)Cr(35) | 100 | 2 | 0.014 | 2370 | HF | −100 | 600 |
| EX 27 | Co(80)Cr(14)Ta(6) | 260 | 112 | 130 | Co(63)Cr(37) | 100 | 0 | 0 | 2380 | HF | −100 | 600 |
| EX 28 | Co(80)Cr(14)Ta(6) | 260 | 100 | 130 | Co(56)Cr(44) | 100 | 0 | 0 | 2340 | HF | −100 | 600 |
| CEX 9 | Co(80)Cr(14)Ta(6) | 260 | 120 | 133 | Co(76)Cr(24) | 100 | 31 | 0.217 | 1690 | HF | −100 | 600 |
| CEX 10 | Co(80)Cr(14)Ta(6) | 260 | 98 | 138 | Co(46)Cr(54) | 100 | 0 | 0 | 1880 | HF | −100 | 600 |
| EX 29 | Co(70)Cr(21)Pt(9) | 400 | 172 | 207 | Co(63)Cr(37) | 100 | 0 | 0 | 2410 | HF | −100 | 600 |
| EX 30 | Co(70)Cr(21)Pt(9) | 300 | 136 | 162 | Co(63)Cr(37) | 100 | 0 | 0 | 2640 | HF | −100 | 600 |
| EX 31 | Co(70)Cr(21)Pt(9) | 350 | 155 | 194 | Co(63)Cr(37) | 100 | 0 | 0 | 2500 | HF | −100 | 600 |
| EX 32 | Co(70)Cr(21)Pt(9) | 250 | 117 | 139 | Co(63)Cr(37) | 100 | 0 | 0 | 2730 | HF | −100 | 600 |
| EX 33 | Co(70)Cr(21)Pt(9) | 160 | 81 | 95 | Co(63)Cr(37) | 100 | 0 | 0 | 2570 | HF | −100 | 600 |
| EX 34 | Co(70)Cr(21)Pt(9) | 225 | 98 | 113 | Co(63)Cr(37) | 100 | 0 | 0 | 2730 | HF | −100 | 600 |
| CEX 11 | Co(70)Cr(21)Pt(9) | 200 | 75 | 90 | | 0 | | | 2120 | HF | −100 | 600 |
| CEX 12 | Co(70)Cr(21)Pt(9) | 250 | 107 | 126 | | 0 | | | 2180 | HF | −100 | 600 |
| CEX 13 | Co(70)Cr(21)Pt(9) | 350 | 143 | 181 | | 0 | | | 2180 | HF | −100 | 600 |
| CEX 14 | Co(70)Cr(21)Pt(9) | 400 | 159 | 199 | | 0 | | | 2110 | HF | −100 | 600 |
| CEX 15 | Co(70)Cr(21)Pt(9) | 300 | 126 | 156 | | 0 | | | 2160 | HF | −100 | 600 |

TABLE 1-2

| | Magnetic Layer (ML) | Thickness (Å) | Br·t (ML) (G·μm) | Bs·t (ML) (G·μm) | Intermediate Layer (IL) | Bs·t Thickness (Å) | (IL) (G·μm) | Bs·t (ML) /Bs·t (IL) | H c (Oe) | Sputter Method | Bias V | Thickness of Cr Underlayer (Å) |
|---|---|---|---|---|---|---|---|---|---|---|---|---|
| EX 35 | Co(56.5)Ni(30)Cr(7.5)B(3)Ta(3) | 200 | 113 | 136 | Co(63)Cr(37) | 50 | 0 | 0 | 2738 | DC | −500 | 600 |
| EX 36 | Co(56.5)Ni(30)Cr(7.5)B(3)Ta(3) | 300 | 180 | 205 | Co(63)Cr(37) | 50 | 0 | 0 | 2525 | DC | −500 | 600 |
| EX 37 | Co(56.5)Ni(30)Cr(7.5)B(3)Ta(3) | 500 | 300 | 345 | Co(63)Cr(37) | 50 | 0 | 0 | 2138 | DC | −500 | 600 |
| CEX 16 | Co(56.5)Ni(30)Cr(7.5)B(3)Ta(3) | 200 | 112 | 130 | | 0 | | | 2288 | DC | −500 | 600 |
| CEX 17 | Co(56.5)Ni(30)Cr(7.5)B(3)Ta(3) | 300 | 186 | 216 | | 0 | | | 2238 | DC | −500 | 600 |
| CEX 18 | Co(56.5)Ni(30)Cr(7.5)B(3)Ta(3) | 500 | 294 | 313 | | 0 | | | 1875 | DC | −500 | 600 |
| EX 38 | Co(80)Cr(12)Pt(6)Ta(2) | 200 | 121 | 127 | Co(63)Cr(37) | 170 | 0 | 0 | 3207 | DC | −300 | 850 |
| EX 39 | Co(80)Cr(12)Pt(6)Ta(2) | 330 | 206 | 217 | Co(63)Cr(37) | 170 | 0 | 0 | 2976 | DC | −300 | 850 |
| EX 40 | Co(80)Cr(12)Pt(6)Ta(2) | 460 | 310 | 326 | Co(63)Cr(37) | 170 | 0 | 0 | 2637 | DC | −300 | 850 |
| EX 41 | Co(80)Cr(12)Pt(6)Ta(2) | 710 | 516 | 543 | Co(63)Cr(37) | 170 | 0 | 0 | 2230 | DC | −300 | 850 |
| CEX 19 | Co(80)Cr(12)Pt(6)Ta(2) | 200 | 108 | 120 | | 0 | | | 2469 | DC | −300 | 850 |
| CEX 20 | Co(80)Cr(12)Pt(6)Ta(2) | 330 | 214 | 238 | | 0 | | | 2411 | DC | −300 | 850 |
| CEX 21 | Co(80)Cr(12)Pt(6)Ta(2) | 460 | 300 | 333 | | 0 | | | 2220 | DC | −300 | 850 |
| CEX 22 | Co(80)Cr(12)Pt(6)Ta(2) | 710 | 526 | 584 | | 0 | | | 1903 | DC | −300 | 850 |
| EX 42 | Co(78)Cr(17)Ta(5) | 250 | 117 | 134 | Co(63)Cr(37) | 50 | 0 | 0 | 2290 | HF | −100 | 600 |
| EX 43 | Co(78)Cr(17)Ta(5) | 250 | 92 | 131 | Co(63)Cr(37) | 100 | 0 | 0 | 2240 | HF | −100 | 600 |
| EX 44 | Co(78)Cr(17)Ta(5) | 250 | 91 | 130 | Co(63)Cr(37) | 300 | 0 | 0 | 2210 | HF | −100 | 600 |
| EX 45 | Co(78)Cr(17)Ta(5) | 250 | 94 | 118 | Co(63)Cr(37) | 500 | 0 | 0 | 2160 | HF | −100 | 600 |
| CEX 23 | Co(78)Cr(17)Ta(5) | 250 | 87 | 112 | | 0 | | | 1940 | HF | −100 | 600 |
| EX 46 | Co(78)Cr(17)Ta(5) | 250 | 91 | 130 | Co(63)Cr(37) | 100 | 0 | 0 | 1580 | HF | −100 | 100 |
| EX 47 | Co(78)Cr(17)Ta(5) | 250 | 88 | 114 | Co(63)Cr(37) | 100 | 0 | 0 | 2030 | HF | −100 | 200 |
| EX 48 | Co(78)Cr(17)Ta(5) | 250 | 95 | 112 | Co(63)Cr(37) | 100 | 0 | 0 | 2240 | HF | −100 | 300 |
| EX 49 | Co(78)Cr(17)Ta(5) | 250 | 92 | 131 | Co(63)Cr(37) | 100 | 0 | 0 | 2240 | HF | −100 | 600 |

TABLE 1-2-continued

| Magnetic Layer (ML) | Thickness (Å) | Br·t (ML) (G·μm) | Bs·t (ML) (G·μm) | Intermediate Layer (IL) | Bs·t Thickness (Å) | (IL) (G·μm) | Bs·t (ML) /Bs·t (IL) | Hc (Oe) | Sputter Method | Bias V | Thickness of Cr Under layer (Å) |
|---|---|---|---|---|---|---|---|---|---|---|---|
| CEX 24 Co(78)Cr(17)Ta(5) | 250 | 89 | 111 | | | | | 1800 | HF | −100 | 100 |
| CEX 25 Co(78)Cr(17)Ta(5) | 250 | 89 | 111 | | | | | 1930 | HF | −100 | 300 |
| CEX 26 Co(78)Cr(17)Ta(5) | 250 | 87 | 112 | | | | | 1940 | HF | −100 | 600 |

TABLE 2

| | Magnetic Layer (ML) | Thickness (Å) | Br·t (ML) (G·μm) | Bs·t (ML) (G·μm) | Intermediate Layer (IL) | Thickness (Å) | Bs·t (IL) (G·μm) |
|---|---|---|---|---|---|---|---|
| EX 20 | Co(80)Cr(14)Ta(6) | 150 | 63 | 71 | Co(63)Cr(37) | 100 | 0 |
| EX 21 | Co(80)Cr(14)Ta(6) | 280 | 118 | 119 | Co(63)Cr(37) | 100 | 0 |
| EX 22 | Co(80)Cr(14)Ta(6) | 250 | 107 | 118 | Co(63)Cr(37) | 100 | 0 |
| EX 23 | Co(80)Cr(14)Ta(6) | 300 | 141 | 157 | Co(63)Cr(37) | 100 | 0 |
| CEX 5 | Co(80)Cr(14)Ta(6) | 150 | 62 | 68 | | | 0 |
| CEX 6 | Co(80)Cr(14)Ta(6) | 230 | 97 | 114 | | | 0 |
| CEX 7 | Co(80)Cr(14)Ta(6) | 350 | 123 | 143 | | | 0 |
| CEX 8 | Co(80)Cr(14)Ta(6) | 400 | 152 | 177 | | | 0 |

| | Bs·t (ML) /Bs·t (IL) | Hc (Oe) | Sputter Method | Bias (V) | Thickness of Cr Underlayer (Å) | Output (μV) | S/N (dB) | PW50 (nsec) |
|---|---|---|---|---|---|---|---|---|
| EX 20 | 0 | 2100 | HF | −100 | 600 | 458 | 33 | 80 |
| EX 21 | 0 | 2325 | HF | −100 | 600 | 669 | 32 | 85 |
| EX 22 | 0 | 2475 | HF | −100 | 600 | 746 | 32 | 86 |
| EX 23 | 0 | 2338 | HF | −100 | 600 | 901 | 31 | 94 |
| CEX 5 | | 1725 | HF | −100 | 600 | 338 | 31 | 82 |
| CEX 6 | | 1900 | HF | −100 | 600 | 590 | 31 | 85 |
| CEX 7 | | 1663 | HF | −100 | 600 | 720 | 30 | 89 |
| CEX 8 | | 1663 | HF | −100 | 600 | 820 | 29 | 97 |

Obviously, additional modifications and variations of the present invention are possible in light of the above teachings. It is, therefore, to be understood that within the scope of the appended claims, the invention may be practiced otherwise than as specifically described herein.

What is claimed as new and is desired to be secured by Letters Patent of the United States is:

1. A magnetic recording medium, comprising
   a non-magnetic substrate;
   a Co alloy magnetic layer;
   a non-magnetic Cr alloy underlayer positioned between said magnetic layer and said substrate; and
   an intermediate layer formed of a Co alloy having a hcp structure positioned between said magnetic layer and said non-magnetic underlayer without intervening layers, wherein
   the ratio R=(BsIL*tIL)/(BsML*tML)<0.2, wherein (BsIL*tIL) is the product of the saturation magnetic flux density of the Co alloy, which constitutes the intermediate layer and the intermediate layer film thickness, and (BsML*tML) is the product of the saturation magnetic flux density of the Co alloy which constitutes the magnetic layer and the magnetic layer film thickness.

2. The magnetic recording medium as set forth in claim 1, wherein
   said intermediate layer is a Co—M alloy thin film layer, where M is one or more elements selected from the group consisting of Cr, Ti, W, V, Mo and Si.

3. The magnetic recording medium as set forth in claim 2, wherein M is Cr and the Cr content is 27–52 at %.

4. The magnetic recording medium as set forth in claim 1, wherein
   the thickness of said intermediate layer is 10–1000 Å.

5. The magnetic recording medium as set forth in claim 1, wherein,
   the thickness of said non-magnetic underlayer is 100–1000 Å.

6. The magnetic recording medium as set forth in claim 1, wherein
   said non-magnetic underlayer, said intermediate layer and said magnetic layer are successively stacked and formed as films in a vacuum without permitting exposure of the layers to the air.

7. The magnetic recording medium as set forth in claim 1, wherein
   said Co alloy magnetic layer is a CoCr, CoNiCr CoPt alloy magnetic layer.

8. The magnetic recording medium as set forth in claim 1, further comprising a metal coat layer positioned between said non-magnetic substrate and said non-magnetic underlayer.

9. The magnetic recording medium as set forth in claim 1, wherein said magnetic layer has a multi-layer structure.

10. The magnetic recording medium as set forth in claim 1, further comprising a carbonaceous protection layer on said magnetic layer.

11. The magnetic recording medium as set forth in claim 1, wherein the non-magnetic substrate is an aluminum alloy provided with a Ni—P layer, a glass substrate, a Si substrate or a resin substrate.

12. The magnetic recording medium as set forth in claim 1, wherein the thickness of the magnetic layer ranges from 100–800 Å.

13. The magnetic recording medium as set forth in claim 1, further comprising a fluorine lubricating layer on said magnetic layer.

14. The magnetic recording medium as set forth in claim 1, further comprising a carbonaceous protection layer and a fluorine lubricating layer on said magnetic layer.

* * * * *